March 7, 1933.  V. BAILEY  1,900,219
ANIMAL TRAP
Filed April 11, 1932
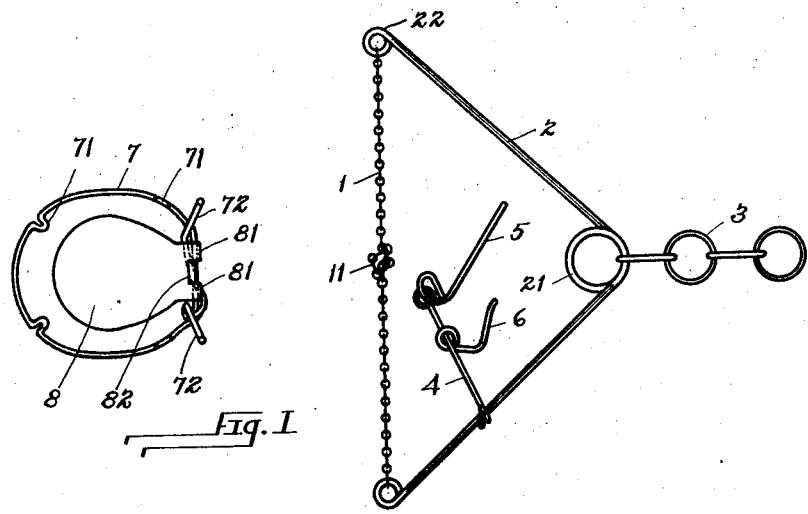
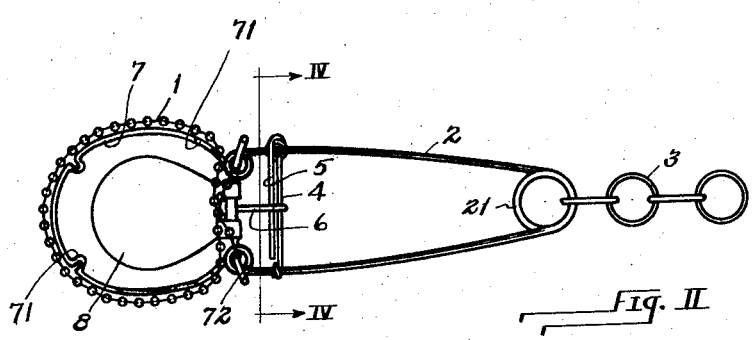
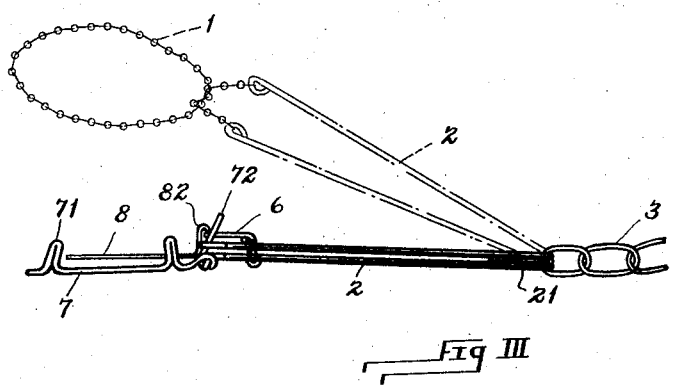
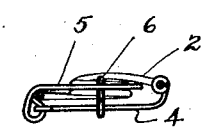
INVENTOR
Vernon Bailey
by Christy Christy and Wharton
his attorneys Patented Mar. 7, 1933

1,900,219

UNITED STATES PATENT OFFICE

VERNON BAILEY, OF WASHINGTON, DISTRICT OF COLUMBIA

ANIMAL TRAP

Application filed April 11, 1932. Serial No. 604,395.

My invention relates to improvements in animal traps. The object in view is a trap which shall catch and hold the animal securely without multilation and without inflicting pain, and from which the captured animal will not, leaving a paw in the trap, effect escape. The trap is designed, primarily, for the capture of larger animals, such as cats, coyotes, and foxes, but is of wider and general applicability.

In the accompanying drawing Fig. I is a view in plan of the trap when sprung; Fig. II is a view in plan of the trap when set; Fig. III is a view in side elevation of the trap when set,—the noose, however, which forms part of the structure, being, for clearness of illustration, omitted. Additionally, Fig. III affords in dotted lines diagrammatic illustration of the noose element in course of operation, as when the trap is sprung. Fig. IV is a view in cross-section, on the plane indicated at IV—IV, Fig. II.

The trap includes a noose element and a pan element, separable the one from the other, and united only when the trap is set. The springing of the trap frees the noose element from the pan element, and it is the noose element alone which remains the effective part of the trap in holding the captured animal. In Fig. I the two elements are shown in separated and detached positions; in Fig. II, as has been said, the two elements are assembled and united, in set position.

The noose element includes a noose, 1; a spring, 2; and, ordinarily, a strand of flexible character, here shown as a chain, 3, for securing the noose element to a stake or drag. The noose element includes also a clasp or shackle composed of two lengths of wire, 4 and 5, linked together, and a trigger 6 pivoted to one length of wire and adapted to overlie the other and secure the shackle in effective position so long as the trap is set. The noose 1 consists essentially of a flexible strand of suitable material; it may and ordinarily will be in the form of a chain of metal. In the length of the noose a knot 11 is formed. When the trap is set this knot is loosened and spread, to form a loop surrounding the pan, as shown in Fig. II. As the ends of the strand are drawn apart the loop diminishes and the knot is drawn tight on the leg of the animal which has sprung the trap.

The spring 2 includes two arms which tend to spread from the collapsed position of Fig. II to the expanded position of Fig. I. To the ends of these arms the ends of the strand are secured. The expansion of the released spring, then, draws the ends of the strand apart and tightens the knot on the leg of the captured animal. Conveniently, the spring is merely a length of resilient wire, shaped to a medial coil 21, with terminal arms. The ends of the arms are formed with eyes 22, in which the ends of the strand 1 may be secured. The eyes, however, have further utility, as presently will appear. The spring is in the form of a bow, and the noose in the form of a bow-string, having in its length a running knot.

The pan element of the trap includes a frame 7 and a pan 8 hinged to the frame. Frame and pan are both of general oval shape. The frame is formed conveniently of wire bent to oval outline and adapted to rest upon the ground, or upon other suitable supporting surface. The frame carries the expanded noose, and is of such size that the loop in the noose of the set trap will with sufficient clearance encircle the foot of the intended victim, when the foot rests upon the pan of the trap, and will insure the springing of the noose upon the leg of the victim. The frame is sufficiently larger than the pan to allow free operation of the noose. The frame may include loop-positioning and guiding fingers 71, and will include two upwardly extending and spreading, spring-guiding fingers 72. The frame is conveniently formed of a single length of wire, bent to shape, with the upwardly extending, inwardly inclined loop-guiding fingers 71, the overlapping ends twisted together to form a rigid structure, and the tips of the length of wire forming the spring-guiding fingers 72. The pan 8 is hinged to the frame in the portion intermediate between the upwardly and outwardly extending fingers 72. It conveniently is formed of sheet metal and is provided with tongues, two of which, 81, are bent around a wire of the frame 7 to constitute the hinged union thereto, and a third 82 is bent upward to constitute a latch for the trigger 6 when the trap is set.

In setting the trap the arms of the spring 2 are collapsed together, the knot in the noose is loosened and spread to a loop, and the spring element is applied to the pan element, with the arms 72 of the pan element threaded through the terminal eyes 22 of the spring. The shackle is then brought to the position shown in Figs. II—IV, and is secured in that position by the engagement of the tip of trigger 6 with the latch 82 upon the pan. The loop is laid externally of the fingers 71. The trap is then in the set position, illustrated in Figs. II—IV. It will be observed that when in this position the pan 8, hinged to the frame 7, is held by engagement of latch 82 with trigger 6, elevated above the surface upon which frame 7 rests, as particularly shown in Fig. III; and it will further be observed that, when an animal rests his paw upon the pan, the pan will swing, releasing the trigger, and springing the trap.

When the trap is sprung the shackle is released, the tension of spring 2 becomes effective, its arms spread, and the knot 11 is drawn tight upon the leg of the animal. And, by virtue of the engagement of the terminal eyes 22 of the spring with the upwardly spreading fingers 72 of the frame, the spring as it expands leaps from the ground and draws the knot taut at a point well up on the leg of the animal, thus insuring a firm and sure hold. The rising of the ends of the spring beyond the ends of the arms 72 separates the noose element of the trap from the pan element, and the animal is held by the noose element with its flexible strand to the stake or drag. The description of the action of the trap when sprung is illustrated in dotted lines in Fig. III.

The trap, it will be perceived, secures the animal, not by means of spring-backed jaws, but by means of a noose; it does not crush nor mutilate; it secures the animal painlessly; nor will the animal escape, leaving in the trap a severed paw.

I claim as my invention:

1. An animal trap consisting of a noose element and a pan element, adapted to be assembled and released and completely separted one from the other, the noose element including a noose and a noose-drawing spring, and the pan element including a rigid one-piece noose positioning frame and a pan hinged thereon, means controlled by the swinging of the pan upon the frame when the parts are assembled for holding the spring of the noose element under tension, and means borne by the frame for guiding the spring element upward when the spring is released.

2. An animal trap consisting of a noose element and a pan element, the noose element consisting of a spring in the form of a bow and a noose in the form of a bow-string having a running knot formed in its extent, together with a shackle and a trigger adapted to secure the shackle in spring-restraining position, and the pan element including a frame with upwardly and outwardly spreading spring-engaging fingers, and a pan with a trigger-engaging latch hinged to the frame.

In testimony whereof I have hereunto set my hand.

VERNON BAILEY.